No. 724,835. PATENTED APR. 7, 1903.
W. FETZER.
STUB RUNNER AND SUBSOIL ATTACHMENT THEREFOR.
APPLICATION FILED SEPT. 27, 1902.
NO MODEL.
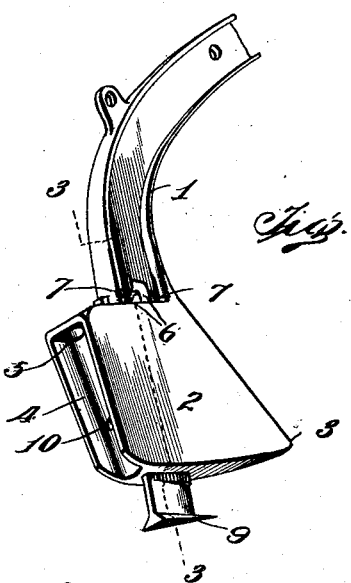
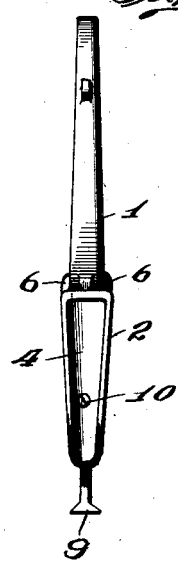
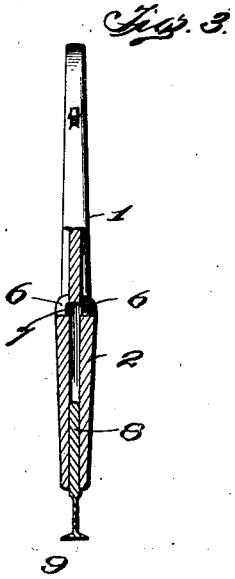
Witnesses
L. G. Handy
Edgar M. Kitchin
Inventor
William Fetzer,
By Mason, Fenwick & Lawrence
Attorneys

United States Patent Office.

WILLIAM FETZER, OF MIDDLETOWN, OHIO.

STUB-RUNNER AND SUBSOIL ATTACHMENT THEREFOR.

SPECIFICATION forming part of Letters Patent No. 724,835, dated April 7, 1903.

Application filed September 27, 1902. Serial No. 125,109. (No model.)

*To all whom it may concern:*

Be it known that I, WILLIAM FETZER, a citizen of the United States, residing at Middletown, in the county of Butler and State of Ohio, have invented certain new and useful Improvements in Stub-Runners and Subsoil Attachments Therefor; and I do hereby declare the following to be a full, clear, and exact description of the invention, such as will enable others skilled in the art to which it appertains to make and use the same.

The present invention relates to improvements in grain-drills, and particularly to stub-runners and a subsoil attachment therefor.

The object in view is the production, in combination with a stub-runner, of means for loosening the soil upon which the seed is to be deposited; and this object is attained by the employment of a subsoil attachment applied directly to the runner and extending a suitable distance beneath the same.

Other objects and the details of one embodiment of the present invention will be fully hereinafter set forth and specifically claimed.

In the accompanying drawings, Figure 1 represents a perspective view of a stub-runner with the subsoil attachment therefor. Fig. 2 represents a view in rear elevation of the same. Fig. 3 represents a vertical section taken on the plane of line 3 3 of Fig. 1. Fig. 4 represents a detail perspective view of the subsoil attachment.

It is common in the present art to construct a drill-tooth with means for opening the ground for forming a bed for the seed to be planted; but ordinarily such bed is necessarily hard and compact from the smooth flat surface of the drill-tooth which is passed over the same. Of course the roots springing from the seed make their way downward through this hardened surface with difficulty, and the growth of the plant is necessarily retarded by this objectionable condition of the soil. To prevent this objection and to provide a loose bed on which the seed may fall, I employ the elements disclosed in the accompanying drawings, in which—

1 indicates any suitable standard carrying a runner or furrow-opener 2, formed with an opening-nose 3 and the usual groove 4, provided with a ring 5 at its upper end for receiving a discharge-spout from a grain-supply receptacle. The runner 2 is formed with a longitudinal vertical opening or passage-way 6, extending vertically therethrough, suitable apertures 7 7 being formed at the lower end of standard 1 for communicating with the upper end of the passage-way 6 for purposes hereinafter specified.

Positioned within the passage-way 6 and vertically adjustable therein is a web 8, carrying at its lower end a suitable shovel 9, said web and shovel forming the subsoil attachment, and in operation the shovel is caused to travel parallel with the surface of the ground and spaced beneath the lower edge of the runner 2. Any suitable set-screw 10 enters the passage-way 6 and contacts with web 8 for locking the same in a given adjusted position.

In operation the standard 1 of runner 2 is attached to any suitable drag-bar, any preferred number of runners being carried by a drill, and the nose 3 is caused to pass through the ground at the given depth for forming the bed for the seed being discharged down groove 4, while the shovel 9, moving beneath the under edge of the runner 2, plays the part of a subsoiler, lifts and loosens the earth which had been compressed by the nose 3, and forms a cultivated bed for the reception of the seed being sown.

In the use of the present improved structure I find it desirable at times to alter the distance between the shovel 9 and the lower edge of runner 2, and hence have provided set-screw 10 for permitting vertical adjustment of web 8 and at the same time locking the said web when positioned at any given point.

In the course of use of the present structure I find at times that the passage-way 6 is liable to become clogged with foreign matter, and the apertures 7 afford approach to such passage for cleaning the same, so as to permit the ready vertical adjustment of the web 8.

Having thus fully described my invention, what I claim as new, and desire to secure by Letters Patent, is—

1. In a device of the class described, the combination with a stub-runner for drills, of a subsoil attachment therefor, extending beneath the same, substantially as described.

2. In a device of the class described, the combination with a stub-runner for grain-drills, of a subsoil attachment carried thereby and extending beneath the horizontal plane of the lower edge of said runner, substantially as described.

3. A device of the class described, comprising a stub-runner having an opening-nose, a seed-discharging passage-way from the same, and a subsoil attachment carried by said runner between the nose and the point of discharge of the seed, substantially as described.

4. A device of the class described, comprising a stub-runner having an opening formed therein, a web adjustable in said opening, and a subsoil-shovel carried by said web, substantially as described.

5. A device of the class described, comprising a stub-runner formed with a vertical passage-way, a web extending into the same from beneath, and a shovel carried at the lower end of said web, substantially as described.

6. A device of the class described, comprising a stub-runner for grain-drills, formed with a longitudinal passage-way therein, a web extending into said passage-way, means for locking said web at various points in said passage-way, and a shovel at the free end of said web, substantially as described.

7. In a device of the class described, the combination with a standard, of a stub-runner carried thereby, having a passage-way extending vertically therethrough, apertures formed in the lower end of said standard and communicating with the upper end of said passage-way, and a subsoil device extending into the passage-way, substantially as described.

8. In a device of the class described, designed to be operated in multiple, the combination with a stub-runner for grain-drills, of a subsoil device carried thereby, and extending vertically beneath the same, centrally thereof, substantially as described.

9. In the device of the class described, the combination with a standard, of a stub-runner carried thereby, comprising a body formed with an opening-nose and a seed-discharge apparatus, substantially as described.

10. A device of the class described, comprising a standard, a furrow-opener having a central opening formed therein in line with the standard, a web adjustable in said opening, and a subsoil device carried by said web, substantially as described.

11. In a device of the class described, the combination with a standard of a furrow-opener carried thereby comprising a body formed with an opening-nose in front, a groove in the rear, and a chute-receiving ring, substantially as described.

In testimony whereof I hereunto affix my signature in presence of two witnesses.

WILLIAM FETZER.

Witnesses:
A. C. FREEZE,
CHAS. KENT.